(12) United States Patent
Chen

(10) Patent No.: US 8,960,353 B2
(45) Date of Patent: Feb. 24, 2015

(54) FOOT-CONTROLLED POWERED VEHICLE

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 34 days.

(21) Appl. No.: 13/853,922

(22) Filed: Mar. 29, 2013

(65) Prior Publication Data
US 2014/0291049 A1 Oct. 2, 2014

Related U.S. Application Data

(60) Provisional application No. 61/618,514, filed on Mar. 30, 2012.

(51) Int. Cl.
B62D 61/02 (2006.01)
B62D 51/00 (2006.01)

(52) U.S. Cl.
CPC .................... B62D 51/001 (2013.01)
USPC .......................... 180/219; 280/214

(58) Field of Classification Search
USPC ........... 180/218–220, 180, 181; 280/214, 210
See application file for complete search history.

(56) References Cited

U.S. PATENT DOCUMENTS

| 6,050,357 | A  | * | 4/2000  | Staelin et al. | 180/65.1 |
| 7,193,376 | B2 | * | 3/2007  | Negoro et al.  | 318/139  |
| 7,363,993 | B2 | * | 4/2008  | Ishii          | 180/7.1  |
| 8,346,441 | B2 | * | 1/2013  | Miki et al.    | 701/49   |
| 2005/0242538 | A1 | * | 11/2005 | Hiramatsu   | 280/92   |
| 2013/0032423 | A1 | * | 2/2013  | Chen         | 180/218  |
| 2014/0069733 | A1 | * | 3/2014  | Kahlert et al. | 180/218 |

* cited by examiner

Primary Examiner — Drew Brown

(57) ABSTRACT

A motorized vehicle for a rider standing with one foot in front of the other, having at least one front wheel and at least one rear wheel. Load sensing means for sensing the amount of weight on each of the rider's feet are attached to or incorporated into the surfaces upon which the rider stands. An electronic control system detects when the distribution of weight between the rider's front and rear feet deviates from a certain ratio, and directs the motor to accelerate or decelerate in order to correct the change and restore the desired weight ratio. In this way the rider can control the speed of the vehicle by shifting her weight forward or backward. The front wheel is steerable by the rider's front foot. Leg contact surfaces facilitate stability as well as precision and control. Another control method is also described.

11 Claims, 3 Drawing Sheets

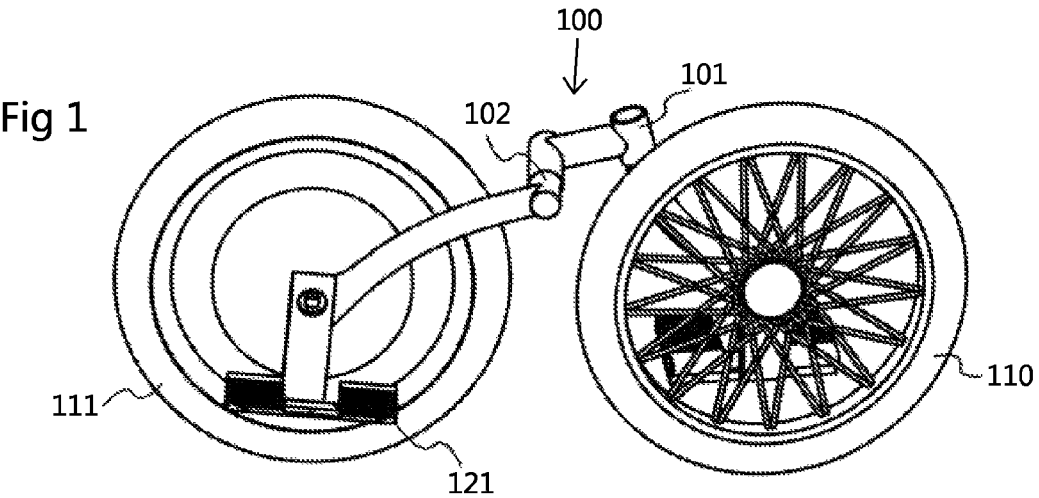
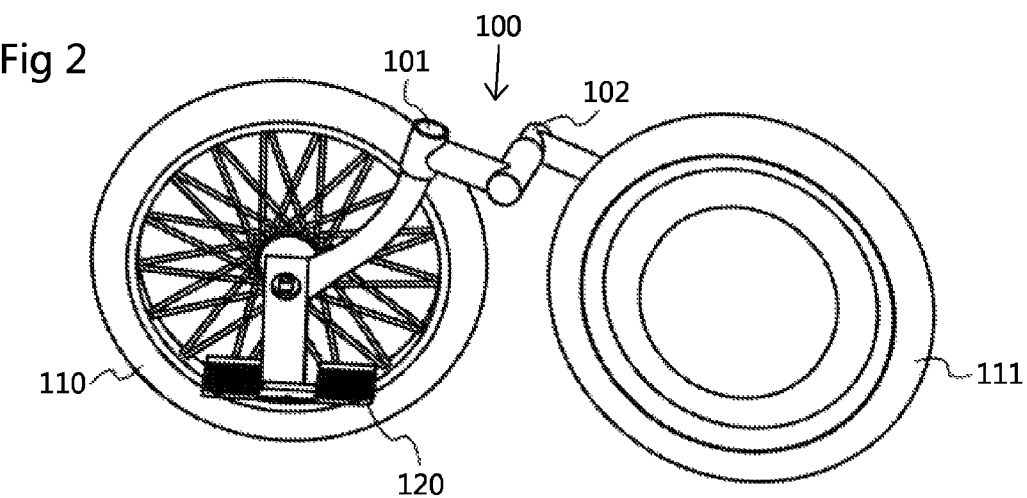
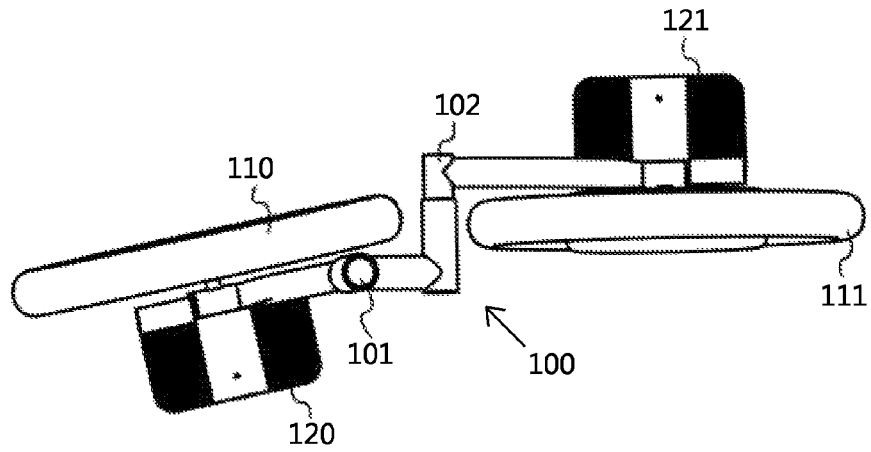

FOOT-CONTROLLED POWERED VEHICLE

CROSS-REFERENCE TO RELATED APPLICATIONS

This application claims the benefit of provisional patent application No. 61/618,514 filed 2012 Mar. 30 by the present inventor.

FIELD OF THE INVENTION

The present invention relates to small motor-driven vehicles designed to be ridden with one foot placed farther forward than the other. It particularly relates to foot-operated methods of controlling such vehicles.

BACKGROUND OF THE INVENTION

Most small personal motor-powered vehicles have hand-operated controls, ranging from standard electric bicycles to motorized skateboards with handheld remote controls. Although such controls are generally easy to use, a foot-operated control system has numerous advantages. In addition to freeing the rider's hands, a control system designed to be operated by the lower body instead of the upper body tends to require fewer parts, less wiring, and generally simpler construction. However, many foot-operated control systems do not have the same precision and ease of use as hand-operated systems. A need therefore exists for a more sophisticated hands-free control system for small personal motorized vehicles.

SUMMARY OF THE INVENTION

The present invention uses an electronic control system which processes input from load sensing means placed under the rider's feet, measuring the distribution of weight between the rider's front and back feet. Using that information, the electronic control system directs the motor to accelerate or decelerate to correct shifts in the rider's center of balance, with the aim of maintaining the distribution of weight between the rider's front and back feet at a certain predetermined ratio. Thus, the rider can cause the vehicle to accelerate by shifting her weight forward, and cause the vehicle to decelerate, stop, or move backwards by shifting her weight rearward.

In the embodiment shown in the figures, the rider's feet are supported by foot pedals placed near the front and rear wheels. The rider can use her front foot to steer the front wheel. The vehicle may have leg contact surfaces disposed generally above the foot pedals in order to aid in stability and precision of control. The frame of the vehicle, to which the wheels and foot pedals are coupled, may have joints that allow it to be folded up for carrying or stowage. Likewise, the foot pedals may be foldable.

In another aspect of the invention, the vehicle is controlled solely by a rear wheel assembly, which includes a rear wheel, a motor for driving the rear wheel, and an electronic control system. This electronic control system detects changes in pitch of the rear wheel assembly and responds by directing the motor to accelerate or decelerate in order to maintain a predetermined neutral pitch angle. Thus the rider can control the vehicle's speed by shifting her weight between the toe and heel of her back foot.

BRIEF DESCRIPTION OF THE FIGURES

FIG. 1 shows a right side perspective view of an embodiment of the vehicle of the present invention.

FIG. 2 shows a left side perspective view of the vehicle.

FIG. 3 shows a top plan view of the vehicle, with the front wheel angled to the left.

LIST OF REFERENCE NUMERALS

Figure 4:
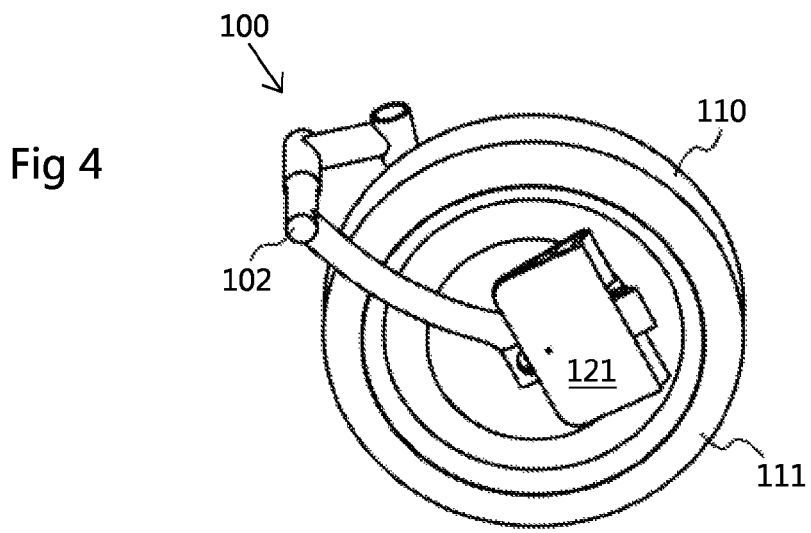
FIG. 4 shows a right side perspective view of the vehicle in folded position.

| 100 | Frame | 120 | Front foot pedal |
|---|---|---|---|
| 101 | Steering joint | 121 | Rear foot pedal |
| 102 | Folding joint | 130 | Front wheel cover |
| 110 | Front wheel | 131 | Rear wheel cover |
| 111 | Rear wheel | 132 | Leg contact surface |

DETAILED DESCRIPTION

FIGS. 1-3 show a vehicle comprising two wheels (front 110 and rear 111) arranged inline, a frame 100 to which front and rear wheels 110 and 111 are coupled, and front and rear foot pedals 120 and 121 for supporting a standing rider. The vehicle also comprises a motor for driving rear wheel 111 which is not shown in detail; there are many methods of implementing such a motor that are known in the art.

Front foot pedal 120 is coupled to front wheel 110, and rear foot pedal 121 is coupled to rear wheel 111. (In this embodiment front foot pedal 120 is on the left side of wheel 110 and rear foot pedal 121 is on the right side of wheel 111, but other embodiments may have the opposite arrangement.) A human rider stands with one foot supported by front foot pedal 120 and the other foot supported by rear foot pedal 121, and both feet facing forward. Load sensing means are provided on foot pedals 120 and 121 for measuring the amount of weight being supported by each of foot pedals 120 and 121. An electronic control system detects when the distribution of the rider's weight between foot pedals 120 and 121 deviates from a certain preprogrammed ratio, and directs the motor to accelerate or decelerate accordingly in order to correct the deviation. For instance, when the rider shifts her weight forward, the load sensing means on front foot pedal 120 detects an increase in supported weight while the load sensing means on rear foot pedal 121 detects a corresponding decrease. The electronic control system responds by directing the motor to accelerate, which causes the rider's weight to shift backward. The motor ceases to accelerate once the distribution of weight across the front and rear foot pedals has been restored to the preprogrammed ratio. Thus the rider can cause the vehicle to accelerate by leaning forward. By the same mechanism, the rider can shift her weight backward to cause the vehicle to slow down, come to a stop, or travel backwards.

Frame 100 includes a steering joint 102 which enables the portion of frame 100 coupled to wheel 110 to twist on a generally vertical axis. A rider can therefore steer the vehicle by using her front foot to turn front wheel 110.

Figure 5:
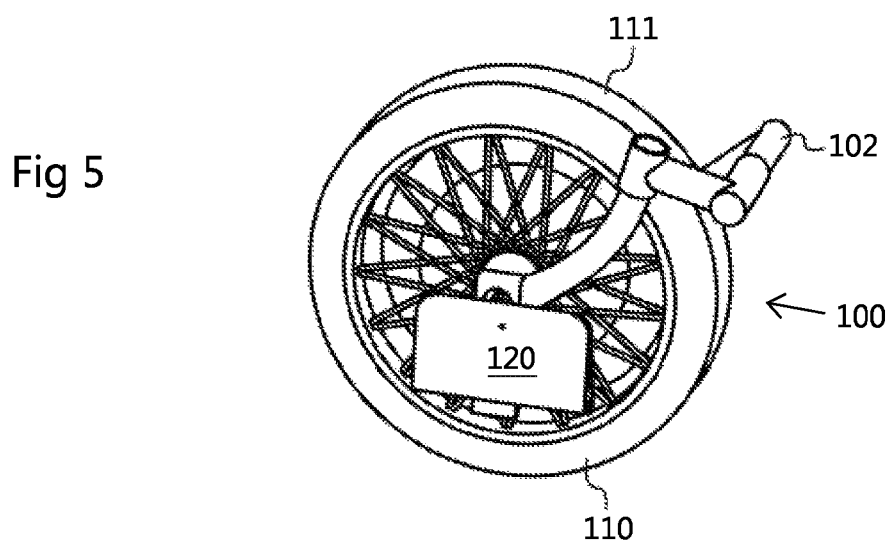
FIG. 5 shows a left side perspective view of the vehicle in folded position.
Figure 6:
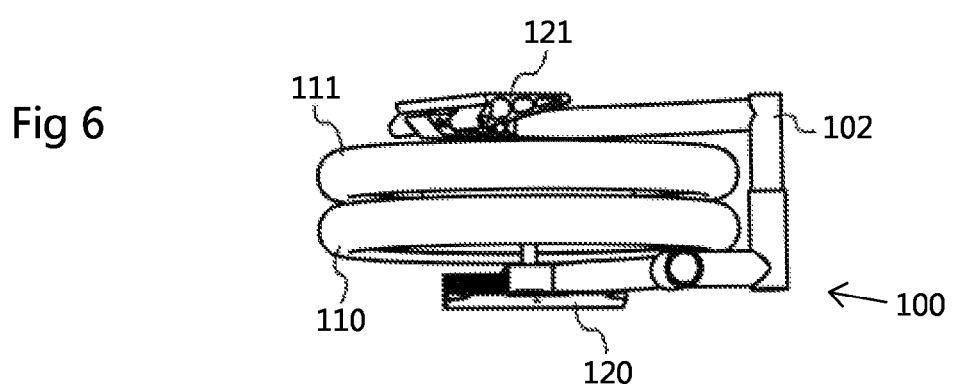
FIG. 6 shows a top plan view of the vehicle in folded position.

The vehicle may be capable of folding or collapsing into a position which facilitates carrying or stowage. FIGS. 4-6 show the vehicle in its collapsed position. In the present embodiment the folding or collapsing is achieved by means of a folding joint 102 in frame 100. While the vehicle is in use, folding joint 102 may be locked so as to be substantially rigid. When unlocked, folding joint 102 slides outward, creating a lateral offset between front wheel 110 and rear wheel 111. Folding joint 102 can then swivel to bring rear wheel 111 alongside front wheel 110. In this embodiment, when the vehicle is fully folded, the axis of rear wheel 111 is substantially in line with the axis of front wheel 110. Foot pedals 120 and 121 may be hinged so as to be upwardly foldable into an orientation generally parallel with wheels 110 and 111, which narrows the profile of the device to aid in stowage and carrying.

In embodiments such as this one in which the foot pedals are foldable, the load sensing means may be placed in the hinge area of foot pedals 120 and 121, such that the weight of the rider exerts a squeezing pressure on the load sensing means.

Figure 7:
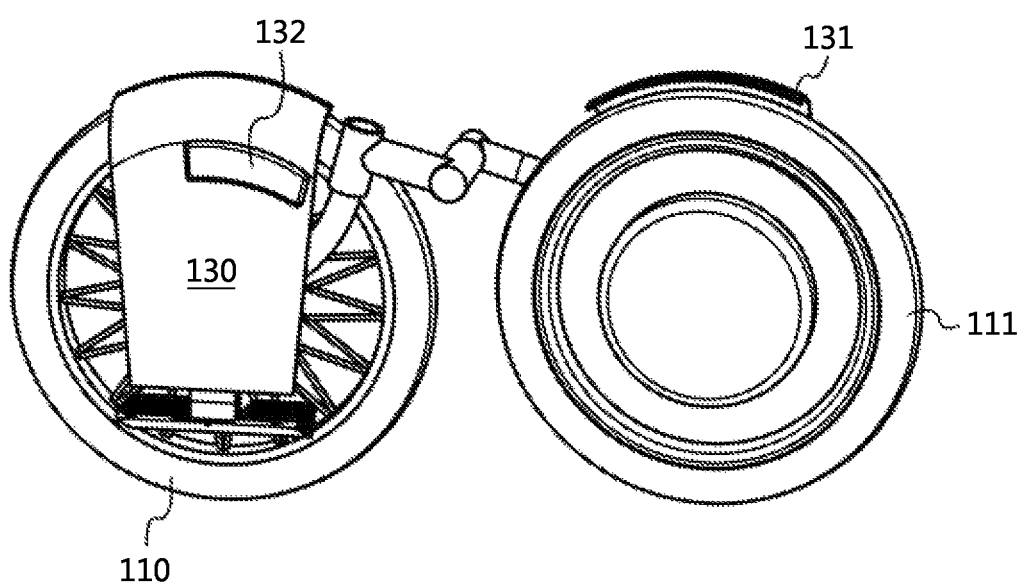
FIG. 7 shows a side perspective view of another embodiment of the vehicle with wheel covers.

FIG. 7 shows an embodiment of the vehicle which is identical to the embodiment of FIGS. 1-6, except that it further comprises front and rear wheel covers 130 and 131 with attached leg contact surfaces 132. Wheel covers 130 and 131 provide support for the rider's lower legs and also prevent the rider's feet, legs, and clothing from coming into contact with wheels 110 and 111. Leg contact surfaces 132 may protrude outward from the sides of wheel covers 130 and 131 at a height where they may be in contact with the knees and/or upper calves of the user. (The leg contact surface on rear wheel cover 131 is not visible in FIG. 7.) The protrusion of leg contact surfaces 132 from wheel covers 130 and 131 allows them to reach the rider's legs when the rider is standing with her foot on foot pedals 120 and 121. Leg contact surfaces 132 may be made of a yielding and/or frictional material such as rubber, and may be slightly curved. These features prevent the rider's legs from slipping against wheel covers 130 and 131, thereby providing stable points of contact which enable more precise control of the vehicle.

A different embodiment of the invention comprises a front wheel and a rear wheel assembly. The rear wheel assembly includes a rear wheel driven by a motor. The methods and components required for implementing such motors are known in the art. The front wheel and rear wheel assembly are both coupled to a frame. The construction of the frame and its coupling with the front wheel allow the front wheel to be steerable by the rider's front foot, which is supported by a front foot pedal. The construction of the frame and its coupling with the rear wheel assembly allow the rear wheel assembly to be tilted forward and backward (i.e., its pitch can be changed), which is controlled by the rider's back foot on a rear foot pedal. There could be only one front and one rear foot pedal, one being disposed on the right side of its respective wheel, and the other being disposed on the left side of its respective wheel; or there may be one foot pedal on each side of both the front and the rear wheels so that the rider can place her preferred foot forward. A gyroscope and/or accelerometer system is associated with the motor; it senses changes in pitch of the rear wheel assembly and regulates the motor accordingly to keep the rear wheel assembly upright. This provides a means for controlling the acceleration and deceleration of the vehicle by using the rear foot to tilt the rear wheel assembly forward or backward. It also enables the rear wheel assembly to self-regulate its balance in the fore-and-aft plane.

The invention claimed is:

1. A motor-driven vehicle comprising:
   a front wheel and a rear wheel;
   a front foot pedal on at least one side of said front wheel, and a rear foot pedal on at least on side of said rear wheel, for supporting the rider's feet alongside said front and rear wheels respectively, wherein said front wheel is steerable by the rider's front foot;
   load sensing means capable of measuring the distribution of weight between the rider's front and back feet;
   a motor for driving at least one of said front and rear wheels; and
   an electronic control system for controlling said motor;
   wherein said electronic control system directs said motor to accelerate or decelerate in response to shifts in the rider's weight as detected by said load sensing means, so as to substantially maintain the distribution of weight between the rider's front and back feet at a certain predetermined ratio.

2. The vehicle of claim 1, further comprising front and rear leg contact surfaces against which the rider's lower legs can rest, made of a yielding material and protruding outward from the main body of said vehicle.

3. The vehicle of claim 1, wherein said front and rear foot pedals are hinged so as to be capable of folding closer to their respective wheels to reduce the profile of said vehicle when not in use.

4. The vehicle of claim 3, wherein said load sensing means is coupled to or incorporated into said hinge on each of said front and rear foot pedals.

5. The vehicle of claim 1, wherein said vehicle can convert to a collapsed position in which said at least one rear wheel is closer to said at least one front wheel than it is when said vehicle is in use.

6. The vehicle of claim 1, wherein said front wheel and said rear wheel are arranged substantially inline.

7. A motor-driven vehicle comprising:
   a steerable front wheel;
   a front foot pedal on at least one side of said front wheel;
   a rear wheel assembly comprising a rear wheel, a rear foot pedal on at least one side of said rear wheel, and a motor for driving said rear wheel;
   a frame to which said front wheel, said front foot pedal, and said rear wheel assembly are coupled;
   an electronic control system for controlling said motor;
   wherein said electronic control system directs said motor to accelerate or decelerate as needed in order to maintain said rear wheel assembly at a certain predetermined neutral pitch angle.

8. The vehicle of claim 7, further comprising front and rear leg contact surfaces against which the rider's lower legs can rest, made of a yielding material and protruding outward from the main body of said frame.

9. The vehicle of claim 7, where said foot pedals are hinged so as to be capable of folding closer to their respective wheels to reduce the profile of said vehicle when not in use.

10. The vehicle of claim 7, wherein said vehicle can convert to a collapsed position in which said rear wheel is closer to said front wheel than it is when said vehicle is in use.

11. The vehicle of claim 7, having a single front wheel and a single rear wheel arranged substantially inline.

\* \* \* \* \*